Patented Sept. 8, 1942

2,295,067

UNITED STATES PATENT OFFICE 2,295,067

DRILLING MUD COMPOSITION

Milton Williams, Houston, Tex., assignor to Standard Oil Development Company, a corporation of Delaware No Drawing. Application October 16, 1937, Serial No. 169,461

11 Claims. (Cl. 252—8.5)

This invention is directed to a drilling fluid and a method for controlling the viscosity thereof.

A drilling fluid is a system usually comprising water, colloidal material, including both gel forming and non-gel forming types, and large particles suspended in the water. Ordinarily the fluid is a slurry of clay in water and may or may not contain weighting material, which is generally a heavy inorganic compound such as any one of various heavy metal oxides or sulfates, and is conventionally referred to as a drilling mud. A typical mud may weigh from 9–18# per gallon.

Of the two types of colloids present the gel forming type is the more important for this type imparts the necessary properties to the drilling mud, namely, stability of suspension, thixotropy, viscosity, pore sealing and gel characteristics in general. Colloids of the non gelling type, together with the larger particles, contribute somewhat to viscosity but more particularly to the density of the mud.

It is generally desirable in drilling practice to maintain the viscosity of the mud below about 20 centipoises as measured by the Stormer Viscosimeter at 10 revolutions per second. Various factors tend to increase the viscosity of the mud. Among these are the infusion into the mud from the substrata of inorganic materials of a gel forming nature and the high temperatures to which the mud is subjected as the depth of the hole increases. It is, therefore, the practice to add to the drilling mud agents which tend to reduce or limit the increase in the viscosity of the mud.

It is not sufficient that a particular agent is capable of reducing the viscosity of a drilling mud at ordinary temperature. It is necessary that the agent retain its viscosity reducing property after being subjected to the elevated temperatures encountered in boreholes. For this reason a reagent which will not effect as great a reduction at normal temperature as another reagent may, nevertheless, be the more desirable of the two if it possesses to a greater degree the property of retaining its viscosity reducing power after being subjected to elevated temperatures.

According to the present invention the viscosity and gelling characteristics of a drilling mud are controlled by adding to the drilling mud a polyhydroxy organic compound produced by the oxidation of a vegetable matter which upon hydrolysis is capable of yielding an aldose, preferably glucose. Among these vegetable materials may be mentioned sugars, starches, dextrin, vegetable gums and the like. The oxidation products are assumed to be acids such as saccharic, arabic, gluconic, mannonic, etc. They are obtained from the vegetable matter in the known manner by oxidation with, for example, an agent such as nitric agent.

These oxidation products may be added to the drilling much as such, but are preferably employed in the form of their alkali metal salts. The reason for this is that the pH value of the drilling mud should be kept on the alkaline side, generally above about 8. If the natural pH value is sufficiently high to stand a reduction, the oxidation products may be added to it as such.

Ordinarily the treating agent in aqueous solution is added to the mud as the latter is circulated from the storage pit to the borehole. The treating agent can, however, be added in solid form or it may be mixed with clays or weighting material prior to the addition of either of these to the mud. Only small amounts of the treating agent need be employed in order to effect the desired decrease in viscosity. The use of amounts varying from traces up to about 5%, by weight, of the mud is contemplated. It is to be understood that the designated upper limit is not critical but is given as a practical limit since the employment of greater amounts leads to no additional advantage.

A specific example of the type of organic compounds employ, according to the present invention, for the treatment of mud is the compound obtained by making a paste of 100 grams of commercial starch in 100 cc. of water, and heating it on a steam bath with 700 cc. of $HNO_3$, specific gravity 1.15, until $NO_2$ is evolved and then continuing the heating at about 66° C. until a syrup is obtained. The saccharic acid in the product is concentrated by diluting it was an equal volume of water and cooling to precipitate oxalic acid.

The saccharic acid solution so obtained was diluted with an equal volume of water and the resulting mixture was used to treat a drilling mud having a viscosity such that a driving force of 195 grams was required to drive a Stormer viscosimeter containing the mud at 600 R. P. M. 0.5 cc. of the dilute saccharic acid reduced the necessary driving force to 114 grams; 1 cc. of the saccharic acid reduced the necessary driving force to 100 grams.

The effect of this treating agent was compared with the effect of sodium hexametaphosphate, a common treating agent, to determine the relative stability of the two to elevated temperatures. 200 cc. of a drilling mud having a viscosity of 45 centipoises was treated with 1 cc. of a 10% solution of sodium hexametaphosphate whereupon the viscosity of the mud was reduced to 20 centipoises. The treated mud was then heated at 180° F. for three hours. Upon cooling it had a viscosity of 30 centipoises.

200 cc. of a similar mud having an original viscosity of 42 centipoises was treated with 1 cc. of a 5% solution of potassium saccharate, whereupon the viscosity of the mud was reduced to 25 centipoises. The treated mud was then heated for three hours at 180° F. Upon cooling its viscosity was 24 centipoises.

In another test the effect of potassium saccharate was compared to that of sodium hexametaphosphate and a mixture of caustic and quebracho extract on a given mud. The mud had an original viscosity of 37 centipoises. Several batches of 200 cc. each were treated with 1 cc. of a 5% solution of sodium hexametaphosphate, a 5% solution of equal parts of caustic and quebracho, and a 5% solution of potassium saccharate, respectively, these samples being referred to as (a), (b) and (c), respectively. After the treatment sample (a) and a viscosity of 15 centipoises, sample (b) had a viscosity of 16 centipoises and sample (c) has a viscosity of 17 centipoises. The samples were then heated at 100° C. for three hours. Upon cooling sample (a) has a viscosity of 30 centipoises, sample (b) a viscosity of 25 centipoises and sample (c) a viscosity of 21 centipoises.

Results similar to those obtained by use of saccharic acid are obtained with the oxidation products of gum arabic, sucrose, glucose, etc.

In the production of oil, the borehole, after it has been drilled to the desired depth, is lined with a casing which is held in place with cement. The cement is fed in at the top of the casing and is forced into position by circulation of the drilling mud. It is desirable that the viscosity of the cement be sufficiently low to make the cement readily pumpable, and that the setting time of the cement be sufficiently great to permit the operator to position it before it sets. The agents described above are useful addition agents to these cements because they reduce the viscosity of the cement and retard its setting time. In the appended claims these cements are included in the expression, "an aqueous slurry of insoluble mineral matter."

The nature and objects of the present invention having been thus described and illustrated what is claimed as new and useful and is desired to be secured by Letters Patent is:

1. A drilling fluid comprising an aqueous slurry of a clay containing a small amount of addition agent selected from the group consisting of polyhydroxy organic acids obtainable by the oxidation of a vegetable substance which is capable of yielding glucose on hydrolysis and salts of said acids.

2. A drilling fluid comprising an aqueous slurry of clay containing a small amount of addition agent selected from the group consisting of polyhydroxy organic acids obtainable by the oxidation of starch and salts of said acids.

3. A drilling fluid comprising an aqueous slurry of clay containing a small amount of an alkali metal saccharate.

4. A drilling fluid comprising an aqueous slurry of clay containing a small amount of potassium saccharate.

5. A drilling fluid comprising, in combination, an aqueous slurry of clay and an addition agent, said agent being selected from the group consisting of polyhydroxy mono-carboxylic open chain acids containing at least five carbon atoms, and salts of said acids.

6. A drilling fluid comprising an aqueous slurry of clay containing saccharic acid.

7. A drilling fluid comprising an aqueous slurry of clay containing arabic acid.

8. A drilling fluid comprising, in combination, an aqueous slurry of clay and an addition agent, said agent being selected from the group consisting of polyhydroxy mono-carboxylic open chain acids containing at least five carbon atoms obtainable by the oxidation of a vegetable substance which is capable of yielding an aldose on hydrolysis, and salts of said acids.

9. A drilling fluid comprising, in combination, an aqueous slurry of clay and an addition agent, said agent being selected from the group consisting of polyhydroxy mono-carboxylic open chain acids derived by oxidation of a material selected from the group consisting of sugars, starches and gums.

10. A process of controlling the viscosity of a mud-laden drilling fluid comprising, adding thereto a small percentage of an agent comprising a sugar acid of a class consisting of saccharic, gluconic, arabic and mannonic acids and their alkali metal salts.

11. A mud-laden well drilling fluid containing as component part a small percentage of an agent comprising a sugar acid of a class consisting of saccharic, gluconic, arabic, and mannonic acids and their alkali metal salts.

MILTON WILLIAMS.